(12) United States Patent
Yamashita et al.

(10) Patent No.: US 9,280,727 B2
(45) Date of Patent: Mar. 8, 2016

(54) INFORMATION PROCESSING UNIT, PRINTING CONTROL METHOD FOR PRINTER DRIVER, AND COMPUTER PROGRAM PRODUCT

(71) Applicants: Yuu Yamashita, Kanagawa (JP); Megumi Okumura, Tokyo (JP); Yusuke Kawatsu, Tokyo (JP); Ken Mitsui, Kanagawa (JP); Kanna Iinuma, Kanagawa (JP); Naoyuki Urata, Kanagawa (JP); Yukihiro Hayakawa, Kanagawa (JP); Masahiro Fukuda, Tokyo (JP); Kenichi Fujioka, Kanagawa (JP); Teruyoshi Yamamoto, Tokyo (JP); Akira Teruya, Kanagawa (JP)

(72) Inventors: Yuu Yamashita, Kanagawa (JP); Megumi Okumura, Tokyo (JP); Yusuke Kawatsu, Tokyo (JP); Ken Mitsui, Kanagawa (JP); Kanna Iinuma, Kanagawa (JP); Naoyuki Urata, Kanagawa (JP); Yukihiro Hayakawa, Kanagawa (JP); Masahiro Fukuda, Tokyo (JP); Kenichi Fujioka, Kanagawa (JP); Teruyoshi Yamamoto, Tokyo (JP); Akira Teruya, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/597,775

(22) Filed: Jan. 15, 2015

(65) Prior Publication Data
US 2015/0206035 A1    Jul. 23, 2015

(30) Foreign Application Priority Data

Jan. 17, 2014 (JP) .................................. 2014-006814
Dec. 8, 2014 (JP) .................................. 2014-248247

(51) Int. Cl.
*G06K 15/00* (2006.01)
*H04N 1/00* (2006.01)
*H04N 1/50* (2006.01)
*G06K 15/02* (2006.01)
*G06F 3/12* (2006.01)

(52) U.S. Cl.
CPC ............ *G06K 15/005* (2013.01); *G06F 3/1204* (2013.01); *G06F 3/1257* (2013.01); *G06F 3/1285* (2013.01); *G06K 15/1848* (2013.01); *H04N 1/00204* (2013.01); *H04N 1/50* (2013.01); *H04N 2201/0094* (2013.01)

(58) Field of Classification Search
USPC ............ 358/1.9, 2.1, 518, 1.15; 382/232, 235
See application file for complete search history.

(56) References Cited

U.S. PATENT DOCUMENTS

| | | | |
|---|---|---|---|
| 6,204,933 B1 * | 3/2001 | Yoshino et al. | ................. 358/1.9 |
| 7,301,669 B1 | 11/2007 | Yamada et al. | |
| 7,679,781 B2 | 3/2010 | Shibuya et al. | |
| 7,948,659 B2 | 5/2011 | Shibuya et al. | |

(Continued)

FOREIGN PATENT DOCUMENTS

| | | |
|---|---|---|
| JP | 2008-009631 | 1/2008 |
| JP | 2008-259137 | 10/2008 |
| JP | 2009-169632 | 7/2009 |

*Primary Examiner* — Quang N Vo
(74) *Attorney, Agent, or Firm* — Harness, Dickey & Pierce, P.L.C.

(57) ABSTRACT

A information processing unit includes: a control unit configured to control operation processing of individual units through a user interface; a print set value storage unit configured to store a print set value that is set by operation of an operation unit on a basic setting screen displayed on a display unit on which setting relating to the color printing is performed at a basic level and a print detail set value that is set by operation of the operation unit on a detail setting screen as another dialog on which the setting is performed at a detail level under operation control of the control unit; and a print data creating unit configured to create print data of the color printing based on the print set value and the print detail set value under operation control of the control unit.

15 Claims, 16 Drawing Sheets

(56) References Cited

U.S. PATENT DOCUMENTS

| | | |
|---|---|---|
| 2002/0030832 A1 | 3/2002 | Shibuya et al. |
| 2006/0215200 A1 | 9/2006 | Mutsuro et al. |
| 2007/0031047 A1 | 2/2007 | Sato et al. |
| 2007/0195345 A1* | 8/2007 | Martinez et al. ............ 358/1.9 |
| 2008/0016307 A1 | 1/2008 | Takano et al. |
| 2008/0291478 A1 | 11/2008 | Shibuya et al. |
| 2012/0188601 A1 | 7/2012 | Kutsuwada et al. |
| 2012/0194862 A1 | 8/2012 | Fukuda et al. |
| 2012/0237243 A1 | 9/2012 | Yamamoto et al. |
| 2012/0237245 A1 | 9/2012 | Mitsui et al. |
| 2012/0307262 A1 | 12/2012 | Fukuda et al. |
| 2013/0003098 A1 | 1/2013 | Hayakawa et al. |
| 2014/0270879 A1 | 9/2014 | Yamamoto et al. |
| 2014/0368852 A1 | 12/2014 | Teruya et al. |

* cited by examiner

FIG.8

| | SETTING ITEMS | SET VALUES |
|---|---|---|
| 1 | RGB Profile<br>(COMMON TO OBJECTS) | ·Path Through<br>·Same As Printer Setting<br>·COLOR PROFILE NAME<br>·Use expert settings |
| 2 | CMYK Profile<br>(COMMON TO OBJECTS) | ·Path Through<br>·Same As Printer Setting<br>·COLOR PROFILE NAME<br>·Use expert settings |
| 3 | Gray Profile<br>(COMMON TO OBJECTS) | ·Path Through<br>·Same As Printer Setting<br>·COLOR PROFILE NAME<br>·Use expert settings |
| 4 | Reference Profile | ·Path Through<br>·Same As Printer Setting<br>·COLOR PROFILE NAME |
| 5 | Output Profile<br>(COMMON TO OBJECTS) | ·Path Through<br>·Same As Printer Setting<br>·COLOR PROFILE NAME<br>·Use expert settings |
| 6 | Spot Color Matching | ·On<br>·Off |
| 7 | Rendering Intent | ·Perceptual<br>·Saturation<br>·Relative Colorimetric<br>·Absolute Colorimetric<br>·Same As Printer Setting |

FIG.9

| No | SETTING ITEMS | SET VALUES |
|----|---------------|------------|
| 1 | RGB Profile-Text | ·Path Through<br>·Same As Printer Setting<br>·COLOR PROFILE NAME |
| 2 | RGB Profile-Line Art | ·Path Through<br>·Same As Printer Setting<br>·COLOR PROFILE NAME |
| 3 | RGB Profile-Smooth Shade | ·Path Through<br>·Same As Printer Setting<br>·COLOR PROFILE NAME |
| 4 | RGB Profile-Image | ·Path Through<br>·Same As Printer Setting<br>·COLOR PROFILE NAME |
| 5 | RGB Rendering Intent-Text | ·Same As Printer Setting<br>·Perceptual<br>·Saturation<br>·Relative Colorimetric<br>·Absolute Colorimetric |
| 6 | RGB Rendering Intent-Line Art | ·Same As Printer Setting<br>·Perceptual<br>·Saturation<br>·Relative Colorimetric<br>·Absolute Colorimetric |
| 7 | RGB Rendering Intent-Smooth Shade | ·Same As Printer Setting<br>·Perceptual<br>·Saturation<br>·Relative Colorimetric<br>·Absolute Colorimetric |
| 8 | RGB Rendering Intent-Image | ·Same As Printer Setting<br>·Perceptual<br>·Saturation<br>·Relative Colorimetric<br>·Absolute Colorimetric |

FIG.10

| No | SETTING ITEMS | SET VALUES |
|---|---|---|
| 1 | CMYK Profile-Text | ·Path Through<br>·Same As Printer Setting<br>·COLOR PROFILE NAME |
| 2 | CMYK Profile-Line Art | ·Path Through<br>·Same As Printer Setting<br>·COLOR PROFILE NAME |
| 3 | CMYK Profile-Smooth Shade | ·Path Through<br>·Same As Printer Setting<br>·COLOR PROFILE NAME |
| 4 | CMYK Profile-Image | ·Path Through<br>·Same As Printer Setting<br>·COLOR PROFILE NAME |
| 5 | CMYK Rendering Intent-Text | ·Same As Printer Setting<br>·Perceptual<br>·Saturation<br>·Relative Colorimetric<br>·Absolute Colorimetric |
| 6 | CMYK Rendering Intent-Line Art | ·Same As Printer Setting<br>·Perceptual<br>·Saturation<br>·Relative Colorimetric<br>·Absolute Colorimetric |
| 7 | CMYK Rendering Intent-Smooth Shade | ·Same As Printer Setting<br>·Perceptual<br>·Saturation<br>·Relative Colorimetric<br>·Absolute Colorimetric |
| 8 | CMYK Rendering Intent-Image | ·Same As Printer Setting<br>·Perceptual<br>·Saturation<br>·Relative Colorimetric<br>·Absolute Colorimetric |

FIG.11

| No | SETTING ITEMS | SET VALUES |
|---|---|---|
| 1 | Gray Profile-Text | ·Path Through<br>·Same As Printer Setting<br>·COLOR PROFILE NAME |
| 2 | Gray Profile-Line Art | ·Path Through<br>·Same As Printer Setting<br>·COLOR PROFILE NAME |
| 3 | Gray Profile-Smooth Shade | ·Path Through<br>·Same As Printer Setting<br>·COLOR PROFILE NAME |
| 4 | Gray Profile-Image | ·Path Through<br>·Same As Printer Setting<br>·COLOR PROFILE NAME |
| 5 | Gray Rendering Intent-Text | ·Same As Printer Setting<br>·Perceptual<br>·Saturation<br>·Relative Colorimetric<br>·Absolute Colorimetric |
| 6 | Gray Rendering Intent-Line Art | ·Same As Printer Setting<br>·Perceptual<br>·Saturation<br>·Relative Colorimetric<br>·Absolute Colorimetric |
| 7 | Gray Rendering Intent-Smooth Shade | ·Same As Printer Setting<br>·Perceptual<br>·Saturation<br>·Relative Colorimetric<br>·Absolute Colorimetric |
| 8 | Gray Rendering Intent-Image | ·Same As Printer Setting<br>·Perceptual<br>·Saturation<br>·Relative Colorimetric<br>·Absolute Colorimetric |

FIG.12

| No | SETTING ITEMS | SET VALUES |
|---|---|---|
| 1 | Output Profile-Text (Front) | ・Path Through<br>・Same As Printer Setting<br>・COLOR PROFILE NAME |
| 2 | Output Profile-Line Art (Front) | ・Path Through<br>・Same As Printer Setting<br>・COLOR PROFILE NAME |
| 3 | Output Profile-Smooth Shade (Front) | ・Path Through<br>・Same As Printer Setting<br>・COLOR PROFILE NAME |
| 4 | Output Profile-Image (Front) | ・Path Through<br>・Same As Printer Setting<br>・COLOR PROFILE NAME |
| 5 | Output Profile-Text (Back) | ・Path Through<br>・Same As Printer Setting<br>・COLOR PROFILE NAME |
| 6 | Output Profile-Line Art (Back) | ・Path Through<br>・Same As Printer Setting<br>・COLOR PROFILE NAME |
| 7 | Output Profile-Smooth Shade (Back) | ・Path Through<br>・Same As Printer Setting<br>・COLOR PROFILE NAME |
| 8 | Output Profile-Image (Back) | ・Path Through<br>・Same As Printer Setting<br>・COLOR PROFILE NAME |
| 9 | Output Rendering Intent-Text | ・Same As Printer Setting<br>・Perceptual<br>・Saturation<br>・Relative Colorimetric<br>・Absolute Colorimetric |
| 10 | Output Rendering Intent-Line Art | ・Same As Printer Setting<br>・Perceptual<br>・Saturation<br>・Relative Colorimetric<br>・Absolute Colorimetric |
| 11 | Output Rendering Intent-Smooth Shade | ・Same As Printer Setting<br>・Perceptual<br>・Saturation<br>・Relative Colorimetric<br>・Absolute Colorimetric |
| 12 | Output Rendering Intent-Image | ・Same As Printer Setting<br>・Perceptual<br>・Saturation<br>・Relative Colorimetric<br>・Absolute Colorimetric |

FIG.13

| Basic Setting | CORRESPONDING SETTING |
|---|---|
| Source Profile (CMYK) | Text (CMYK) |
| | Image (CMYK) |
| | Line Art (CMYK) |
| | Smooth Shade (CMYK) |
| Source Profile (RGB) | Text (RGB) |
| | Image (RGB) |
| | Line Art (RGB) |
| | Smooth Shade (RGB) |
| Source Profile (Gray) | Text (Gray) |
| | Image (Gray) |
| | Line Art (Gray) |
| | Smooth Shade (Gray) |
| Source Profile (Output Profile) | Text Front (Output) |
| | Image Front (Output) |
| | Line Art Front (Output) |
| | Smooth Shade Front (Output) |
| | Text Back (Output) |
| | Image Back (Output) |
| | Line Art Back (Output) |
| | Smooth Shade Back (Output) |

FIG.14

| Rendering Intent | LINKING SETTING |
|---|---|
| Rendering Intent (RGB) | Rendering Intent (CMYK) |
| | Rendering Intent (Gray) |
| | Rendering Intent (Output) |
| Rendering Intent Text (RGB) | Rendering Intent Text (CMYK) |
| | Rendering Intent Text (Gray) |
| | Rendering Intent Text (Output) |
| Rendering Intent Image (RGB) | Rendering Intent Image (CMYK) |
| | Rendering Intent Image (Gray) |
| | Rendering Intent Image (Output) |
| Rendering Intent Line Art (RGB) | Rendering Intent Line Art (CMYK) |
| | Rendering Intent Line Art (Gray) |
| | Rendering Intent Line Art (Output) |
| Rendering Intent Smooth Shade (RGB) | Rendering Intent Smooth Shade (CMYK) |
| | Rendering Intent Smooth Shade (Gray) |
| | Rendering Intent Smooth Shade (Output) |
| *SAME APPLIES TO CMYK, Gray AND Output AND FOUR SETTINGS LINK | |

INFORMATION PROCESSING UNIT, PRINTING CONTROL METHOD FOR PRINTER DRIVER, AND COMPUTER PROGRAM PRODUCT

CROSS-REFERENCE TO RELATED APPLICATIONS

The present application claims priority to and incorporates by reference the entire contents of Japanese Patent Application No. 2014-006814 filed in Japan on Jan. 17, 2014 and Japanese Patent Application No. 2014-248247 filed in Japan on Dec. 8, 2014.

BACKGROUND OF THE INVENTION

1. Field of the Invention

The present invention relates to an information processing unit provided in a client terminal (personal computer (PC)) connected, through a network, to a digital front end (DFE) controller for performing high-speed image processing that is externally attached to a printer capable of performing color printing, and performing setting of color printing using a user interface, a printing control method for the printer driver, and a computer program product.

2. Description of the Related Art

In recent years, printed matters become products in the production printing industry, so that detail settings for color printing can be generally performed by drivers for offices as printer drivers for production printing. More specifically, printer drivers that cause color profile setting, rendering intent setting, and the like to be displayed in a flowchart format in a visually easy-to-understand manner so as to enable a user to perform setting of the color printing have been already developed.

Related well-known techniques include a "printing device, control method thereof, and program" (see, Japanese Patent Application Laid-open No. 2008-9631) that can address user needs that would be desired in the future in a printing environment like a print on demand (POD) environment that is supposed when the device is configured to comply with a job definition format (JDF).

The technique as disclosed in Japanese Patent Application Laid-open No. 2008-9631 aims at improvement in operability of color printing profile setting that is difficult to be understood by a user, with a function of a server (Efl Driver) and discloses a user interface enabling the profile setting to be performed in a flowchart format in accordance with a processing flow on a dialog different from a normal print setting screen.

The color printing setting screen with the technique as disclosed in Japanese Patent Application Laid-open No. 2008-9631 and the known color printing setting screens are configured such that the color printing profile setting is performed not on a basic setting screen but on a detail setting screen (a possible factor for this includes that the number of profile setting items is large and they cannot be included in the basic setting screen). Due to this, the profile setting needs to be performed by opening another dialog because it cannot be performed on the normal print setting screen. Even when basic setting such as profile setting common to objects is required, for example, the profile setting cannot be performed on the normal setting screen, resulting in a troublesome task of opening another dialog. This causes a problem that processing is complicated.

In view of the above, there is a need to provide an information processing unit, a printing control method for the printer driver, and a computer program product that cause basic setting relating to color printing to be arranged on a basic setting screen and enable detail setting to be performed separately so as to eliminate complication of print setting.

SUMMARY OF THE INVENTION

It is an object of the present invention to at least partially solve the problems in the conventional technology.

An information processing unit is provided in a client terminal connected, through a network, to a controller that is externally attached to a printer capable of performing color printing and is configured to perform high-speed image processing. The information processing unit performs setting of the color printing using a user interface connected to a display unit and an operation unit. The information processing unit includes: a control unit configured to control operation processing of individual units through the user interface; a print set value storage unit configured to store a print set value that is set by operation of the operation unit on a basic setting screen displayed on the display unit on which setting relating to the color printing is performed at a basic level and a print detail set value that is set by operation of the operation unit on a detail setting screen as another dialog on which the setting is performed at a detail level under operation control of the control unit; a print data creating unit configured to create print data of the color printing based on the print set value and the print detail set value under operation control of the control unit; a data transmission unit configured to transmit the print data to the printer via the controller through the network under operation control of the control unit; and a data receiving unit configured to receive information from the printer via the controller through the network under operation control of the control unit.

A printing control method is for a printer driver provided in a client terminal connected, through a network, to a controller that is externally attached to a printer capable of performing color printing and is configured to perform high-speed image processing. The printer driver performs setting of the color printing using a user interface connected to a display unit and an operation unit. The printing control method includes: controlling, by a control unit, operation processing of individual units through the user interface; storing, by a print set value storage unit, a print set value that is set by operation of the operation unit on a basic setting screen displayed on the display unit on which setting relating to the color printing is performed at a basic level and a print detail set value that is set by operation of the operation unit on a detail setting screen as another dialog on which the setting relating to the color printing is performed at a detail level under operation control at the controlling; creating, by a print data creating unit, print data of the color printing based on the print set value and the print detail set value under operation control at the controlling; transmitting, by a data transmitting unit, the print data to the printer via the controller through the network under operation control at the controlling; and receiving, by a data receiving unit, information from the printer via the controller through the network under operation control at the controlling.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating set values for color function setting items that are displayed on the basic setting screen as described in FIG. 7 in the order of identification number;

FIG. 9 is a diagram illustrating set values for RGB profile-related setting items that are displayed on the detail setting screen as described in FIG. 7 in the order of identification number;

FIG. 10 is a diagram illustrating set values for CMYK profile-related setting items that are displayed on the detail setting screen as described in FIG. 7 in the order of identification number;

FIG. 11 is a diagram illustrating set values for Gray profile-related setting items that are displayed on the detail setting screen as described in FIG. 7 in the order of identification number;

FIG. 12 is a diagram illustrating set values for Output profile-related setting items that are displayed on the detail setting screen as described in FIG. 7 in the order of identification number;

FIG. 13 is a diagram illustrating a correspondence table between items on the basic setting screen and items on the detail setting screen in the color setting relating to the printer driver as illustrated in FIG. 4;

FIG. 14 is a diagram illustrating a linkage correspondence table at the time of setting of rendering intent in the color setting relating to the printer driver as illustrated in FIG. 4;

DETAILED DESCRIPTION OF THE PREFERRED EMBODIMENTS

Hereinafter, embodiments of an information processing unit, a printing control method for a printer driver, and a computer program product according to the invention will be described in detail using an embodiment with reference to the drawings.

Embodiment

Figure 1:
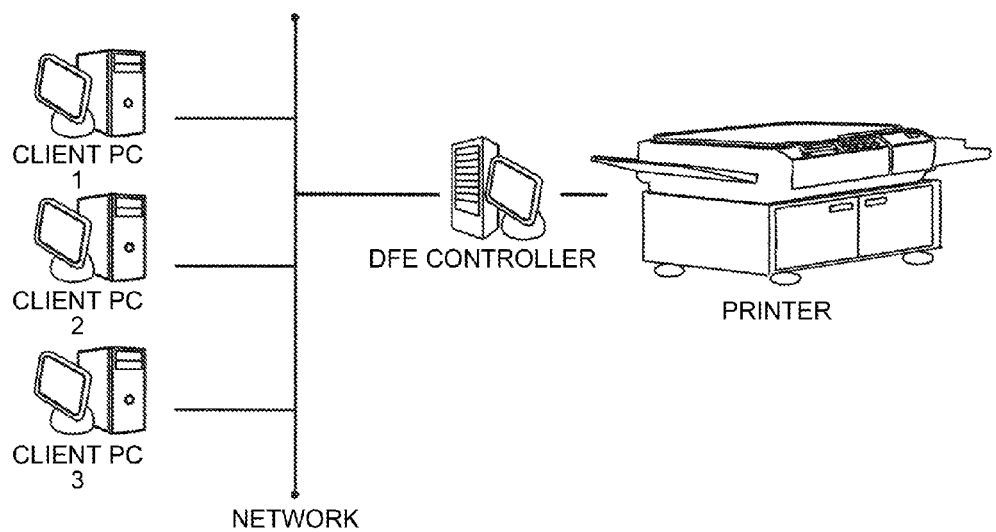
FIG. 1 is a schematic diagram illustrating the basic configuration of a printing system including client terminals to which a printer driver according to an embodiment of the present invention is applied and a printer capable of performing color printing.

FIG. 1 is a schematic view illustrating the basic configuration of a printing system including client terminals to which a printer driver (information processing unit) according to an embodiment of the invention is applied and a printer capable of performing color printing. The printing system is configured by connecting three client personal computers (PCs) 1 to 3 as the client terminals to a DFE controller for performing high-speed image processing through a network. The DFE controller is externally attached to the printer capable of performing color printing. Each of the client PCs 1 to 3 has a printer driver function that performs setting of color printing using a user interface.

In the printing system, as a basic operation, when a user performs setting of color printing using the user interface with the client PC 1, 2, or 3 and transfers a JDF job ticket to the DFE controller through a network so as to issue a print instruction, the DFE controller interprets the received JDF job ticket and issues a print instruction to the printer. It should be noted that the number of the connected client terminals may not be three.

Figure 2:
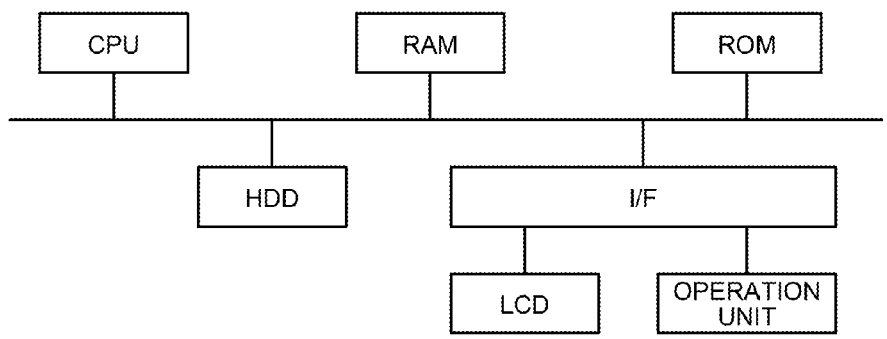
FIG. 2 is a block diagram illustrating the basic configuration of the client terminal included in the printing system as illustrated in FIG. 1 on hardware.

FIG. 2 is a block diagram illustrating the basic configuration of the client terminal on hardware. The client terminal is configured by connecting a central processing unit (CPU), a random access memory (RAM), a read only memory (ROM), a hard disk drive (HDD), and a network interface (I/F) through a bus. The CPU functions as a control unit that has an arithmetic function and controls operation processing of individual units of the personal computer PC overall. The RAM is a volatile storage medium capable of high-speed reading and writing of information and is used as a work area when the CPU performs information processing. The ROM is a read-only non-volatile storage medium storing therein computer programs such as firmware. The HDD is a non-volatile storage medium capable of reading and writing information and stores therein an operating system (OS), control programs and application programs of various types, and the like.

Among them, the network interface is an interface for connecting the bus and the individual units on the hardware and the network and controlling them. A liquid crystal display (LCD) as a display unit and an operation unit are connected to the network interface. The LCD is a display for making display by which a user visually checks a state of the client terminal. The operation unit is a unit for enabling the user to input information to the client terminal with a keyboard, a mouse, or the like. Each of the LCD and the operation unit functions as a user interface.

Although the functional configuration of the client terminal of the personal computer specification has been described with reference to FIG. 2, servers and other mobile terminals are configured in the same manner on the hardware, so that they can be used instead.

Figure 3:
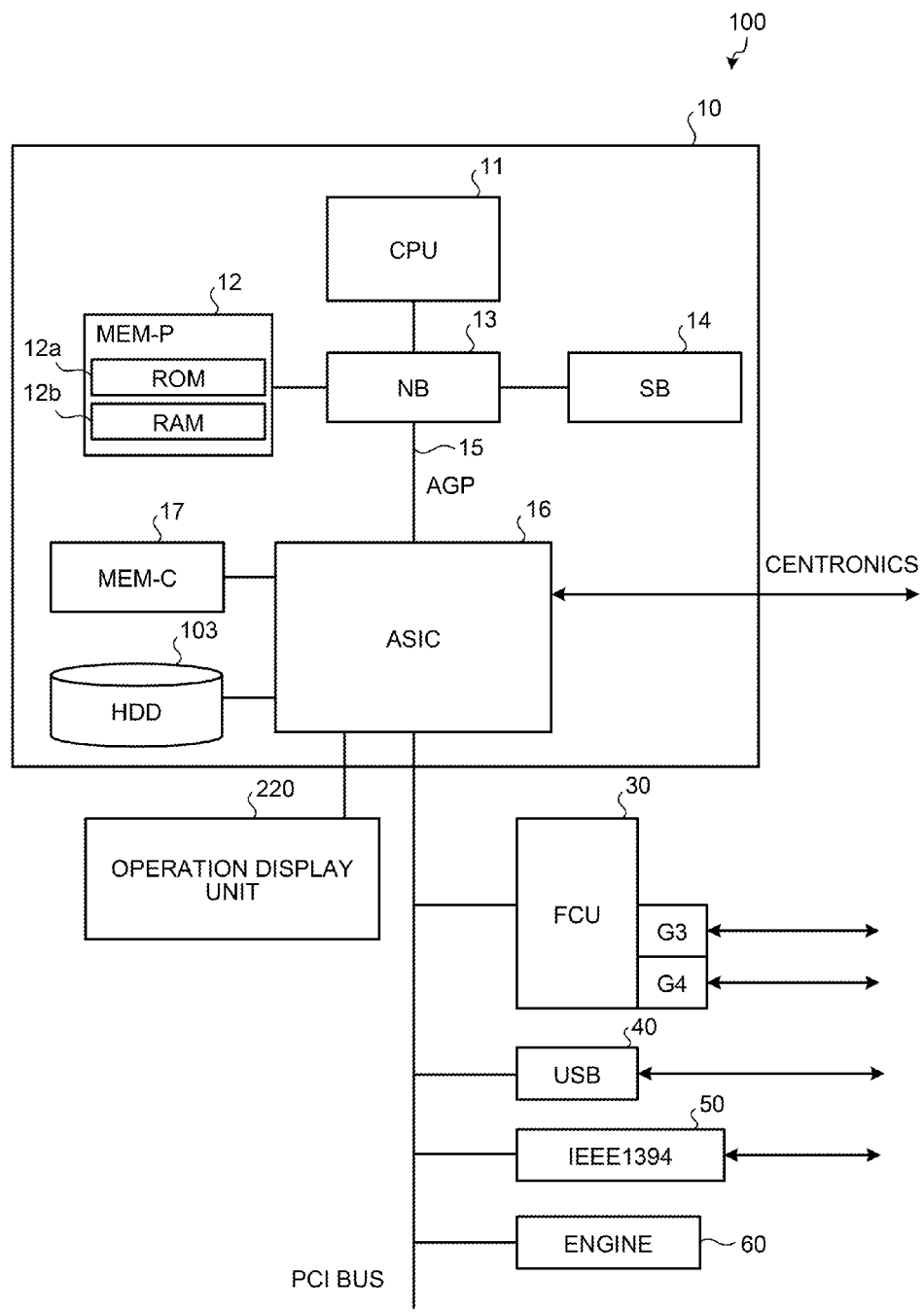
FIG. 3 is a block diagram illustrating the basic configuration of the printer included in the printing system as illustrated in FIG. 1 on hardware.

FIG. 3 is a block diagram illustrating the basic configuration of a printer (printing device) 100 on the hardware. The printer 100 is of multifunction peripheral (MFP) specification as a digital multifunctional peripheral in which a plurality of functions including a printer function, a copying function, a scanner function, and a facsimile function are collected in one housing. The printer 100 is configured by connecting a controller 10 and an engine unit (Engine) 60 through a peripheral component interface (PCI) bus.

The controller 10 has functions of controlling the printer 100 overall and controlling drawing, communication, and input from an operation unit (not illustrated). The engine unit 60 serves as an engine of a printing device that can be connected to the PCI bus and is configured by including a black-and-white plotter, a one-drum color plotter, a four-drum color plotter, a scanner, or a facsimile unit, for example. The engine unit 60 includes a part (image processing unit) that performs image processing such as error diffusion and gamma conversion in addition to a what-is-called engine part such as the plotter.

The controller 10 controls the printer 100 overall and is configured by including a CPU 11, a local memory MEM-C 17, a hard disk drive HDD 103, and an application specific integrated circuit (ASIC) 16. The CPU 11 is connected to another device through a chip set formed by a north bridge NB 13, a system memory MEM-P 12 including a read only memory (ROM) 12a and a random access memory (RAM) 12b, and a south bridge SB 14. The local memory MEM-C 17 is used as a copy image buffer or a coding buffer. The HDD 103 is a storage for accumulating therein image data, computer programs, font data, and forms and stores therein license files of applications that are executed by the printer 100. The ASIC 16 is an integrated circuit (IC) for image processing that has hardware elements for image processing, and serves as a bridge for connecting an accelerated graphics port (AGP) bus 15 connected between the ASIC 16 and the north bridge NB 13, the PCI bus, the hard disk drive HDD 103, and the local memory MEM-C 17.

Among them, the north bridge NB 13 is a bridge for connecting the CPU 11 and the system memory MEM-P 12, the south bridge (SB) 14, and the AGP bus 15 and has a memory controller function of controlling reading and writing of information from/into the system memory MEM-P 12, a PCI master function, and an AGP target function.

The system memory MEM-P 12 is a system memory that is used as a storage memory for computer programs and data, a memory for deploying computer programs and data, a drawing memory of the printer, and/or the like, and is configured by including the ROM 12a and the RAM 12b. The ROM 12a is a read-only-memory that is used as the storage memory for computer programs and data and the RAM 12b is a readable/writable memory that is used as the memory for deploying computer programs and data and the drawing memory of the printer.

The south bridge (SB) 14 is a bridge for connecting the north bridge NB 13 and a PCI device and a peripheral device, and is connected to the north bridge NB 13 through the PCI bus. It should be noted that the network interface (I/F) and the like are also connected to the PCI bus.

The ASIC 16 is of a type that supports a bidirectional centronics-compatible interface that allows connection through a parallel port. The ASIC 16 has a PCI target function and an AGP master function and includes an arbiter ARB forming the core, a memory controller controlling the local memory MEM-C 17, a plurality of direct memory access controllers (DMAC) rotating image data by a hardware logic or the like, and so on, and a PCI unit performing data transfer to and from the engine unit 60 through the PCI bus. A facsimile control unit (FCU) 30 including signal transmission/receiving units G3 and G4, a universal serial bus (USB) 40, and an institute of electrical and electronics engineers 1394 (IEEE 1394) interface 50 are connected to the ASIC 16 through the PCI bus. In addition, an operation display unit 220 is connected directly to the ASIC 16.

The AGP bus 15 is a bus interface for a graphics accelerator card proposed for increasing the speed of graphic processing, and directly accesses to the system memory MEM-P 12 at high throughput so as to increase the processing speed of the graphics accelerator card.

Figure 4:
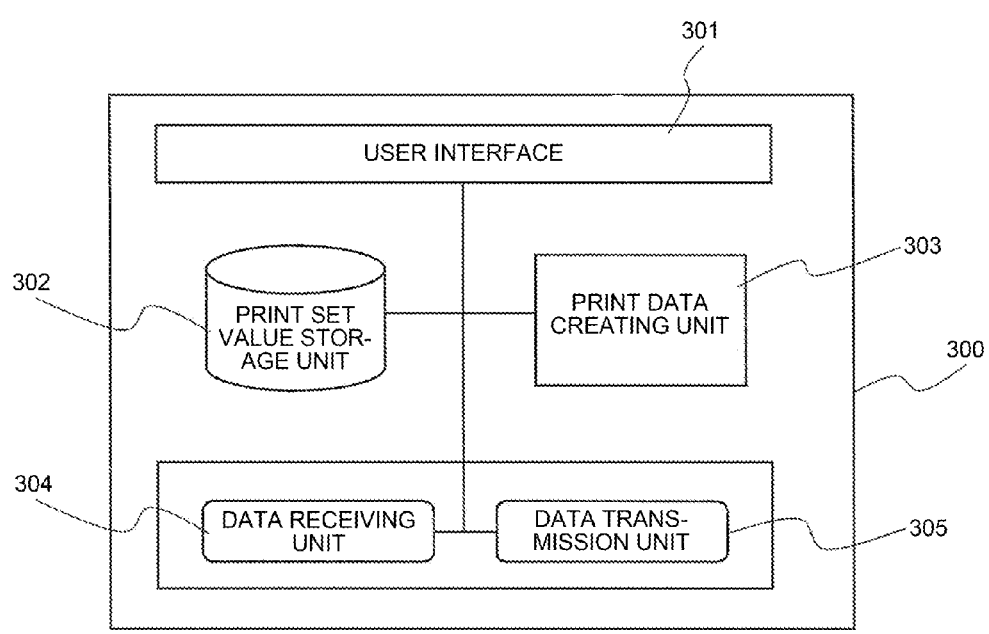
FIG. 4 is a block diagram illustrating the functional configuration of the printer driver provided in the client terminal included in the printing system as illustrated in FIG. 1.

FIG. 4 is a block diagram illustrating the functional configuration of a printer driver 300 included in the client terminal. The printer driver 300 performs setting of color printing using a user interface 301. The printer driver 300 is configured by including a CPU, a print set value storage unit 302, a print data creating unit 303, a data transmission unit 305, and a data receiving unit 304. The CPU is a control unit that controls operation processing of individual units through the user interface 301 belonging to the network interface as illustrated in FIG. 2. The print set value storage unit 302 stores therein a print set value that is set by operation of the operation unit on a basic setting screen displayed on the display unit (LCD) on which the setting relating to the color printing is performed at a basic level and a print detail set value that is set by operation of the operation unit on a detail setting screen as another dialog on which setting relating to the color printing is performed at a detail level under operation control of the CPU. The print data creating unit 303 creates print data of the color printing based on the print set value and the print detail set value under the operation control of the CPU. The data transmission unit 305 transmits the print data to the printer via the DFE controller through the network under the operation control of the CPU. The data receiving unit 304 receives information from the printer via the DFE controller through the network under the operation control of the CPU.

The printer driver 300 enables the user to perform setting of the color printing by the operation unit while checking the display screen on the display unit through the user interface 301 and the print set value and the print detail set value set on two stages of the basic setting screen and the detail setting screen by operation of the operation unit are stored in the print set value storage unit 302. When a print start instruction is issued through the user interface 301, the print data creating unit 303 creates print data for the color printing based on the print set value and the print detail set value stored in the print set value storage unit 302 and the data transmission unit 305 transmits the created print data to the printer 100. Furthermore, when information is acquired from the printer 100, the information from the printer 100 is received through the data receiving unit 304 and is displayed on the display unit through the user interface 301.

The CPU in the printer driver 300 has a function of performing, on the print set value set on the basic setting screen and the print detail set value set on the detail setting screen that are stored in the print set value storage unit 302, set value synchronization processing of adjusting the print detail set value on the detail setting screen to reflect change of the print set value in a synchronized manner when the print set value is changed on the basic setting screen by operation of the operation unit by the user and adjusting the print set value on the basic setting screen to reflect change of the print detail set value in a synchronized manner when the print detail set value is changed on the detail setting screen. In conjunction with this, when the print set value storage unit 302 functions as a correspondence information storage unit that stores therein correspondence information in which the print set value and the print detail set value are associated with each other, the CPU in the printer driver 300 has a function of performing set value synchronization processing of adjusting the print detail set value on the detail setting screen to reflect change of the print set value based on the correspondence information in a synchronized manner when the print set value is changed on the basic setting screen and adjusting the print set value on the basic setting screen to reflect change of the print detail set value based on the correspondence information in a synchronized manner when the print detail set value is changed on the detail setting screen. Furthermore, the CPU in the printer driver 300 has a function of displaying that the print set value is changed on the basic setting screen when the print set value on the basic setting screen is changed in a synchronized manner at the change of the print detail set value on the detail setting screen. Moreover, the CPU in the printer driver 300 has a function of, on the assumption that the basic setting screen is a setting screen on which profile setting common to objects is performed and the detail setting screen is a setting screen on which profile setting for each object is performed, adjusting the print detail set value according to the profile setting for each object on the detail setting screen to reflect the print set value according to the profile setting common to the objects when the profile setting common to the objects is changed on the basic setting screen and adjusting the print set value according to the profile setting common to the objects on the basic setting screen to reflect a value indicating that the print detail set value according to the profile setting for each object is set individually when the profile setting for each object is changed on the detail setting screen. In conjunction with this, the print data creating unit 303 has a function of specifying a profile for each object and creating print data when the print detail set value is stored in the print set value storage unit 302 and specifying a profile common to the objects and creating print data containing information indicating that the profile is common to the objects when the print detail set value is not stored in the print set value storage unit 302. In addition, the CPU in the printer driver 300 has a function of displaying that the profile setting is changed on the basic setting screen as XXX when the profile setting common to the objects on the basic setting screen is changed at the time of change of the profile setting for each object on the detail setting screen.

Figure 5:
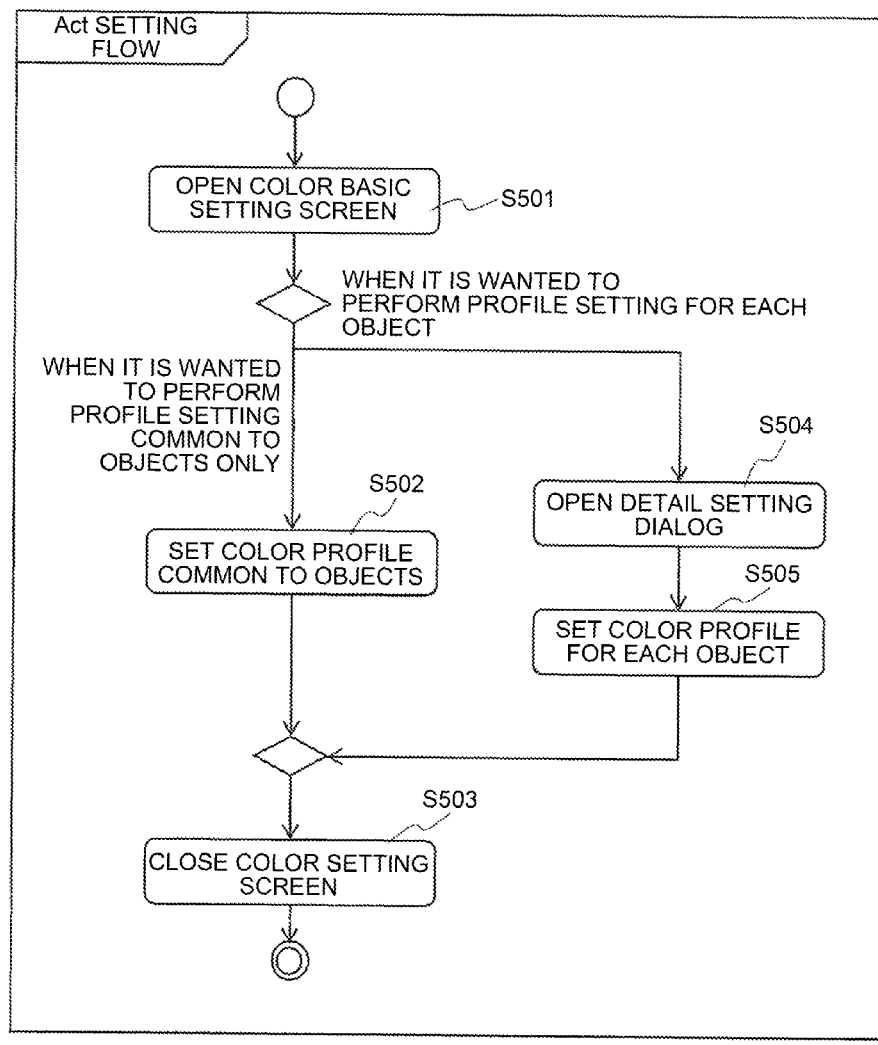
FIG. 5 is a flowchart illustrating color setting operation processing in print setting relating to the printer driver as illustrated in FIG. 4.
Figure 16:
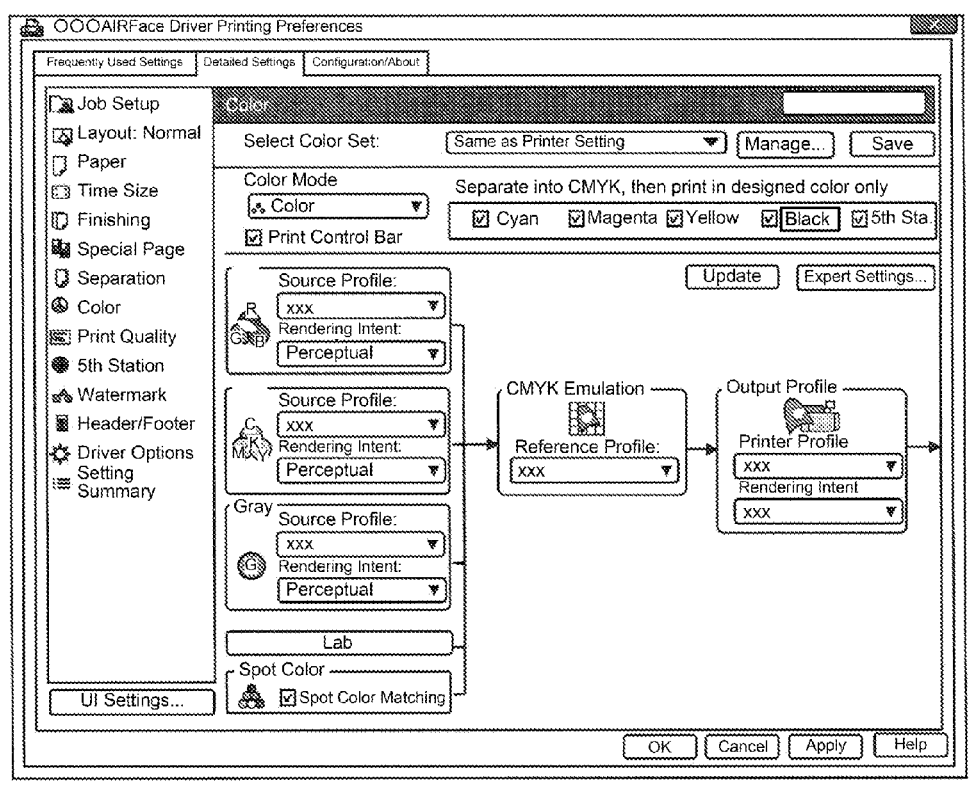
FIG. 16 is a diagram illustrating detail contents of the basic setting screen in the color setting relating to the printer driver as illustrated in FIG. 4.

FIG. 5 is a flowchart illustrating color setting operation processing in the print setting relating to the printer driver 300. In the color setting operation processing in the print setting, when processing of opening a color basic setting screen is performed first (step S501), the basic setting screen on which the color profile is set commonly to objects is opened. The basic setting screen in this case is displayed such that the color profile can be set (the print set value can be set) in accordance with a processing flow. It should be noted that detail contents of the basic setting screen are illustrated in FIG. 16, which will be described later.

To perform only the profile setting common to objects, processing of setting the color profile common to the objects on the basic setting screen (step S502) is performed and profile settings of individual objects (Text, Line Art, Smooth Shade, Image) that can be set in the detail setting are adjusted to reflect this. Thereafter, when desired color setting have been executed, processing of closing the color setting screen (step S503) is performed so as to finish the operation of the color printing setting.

Figure 17:
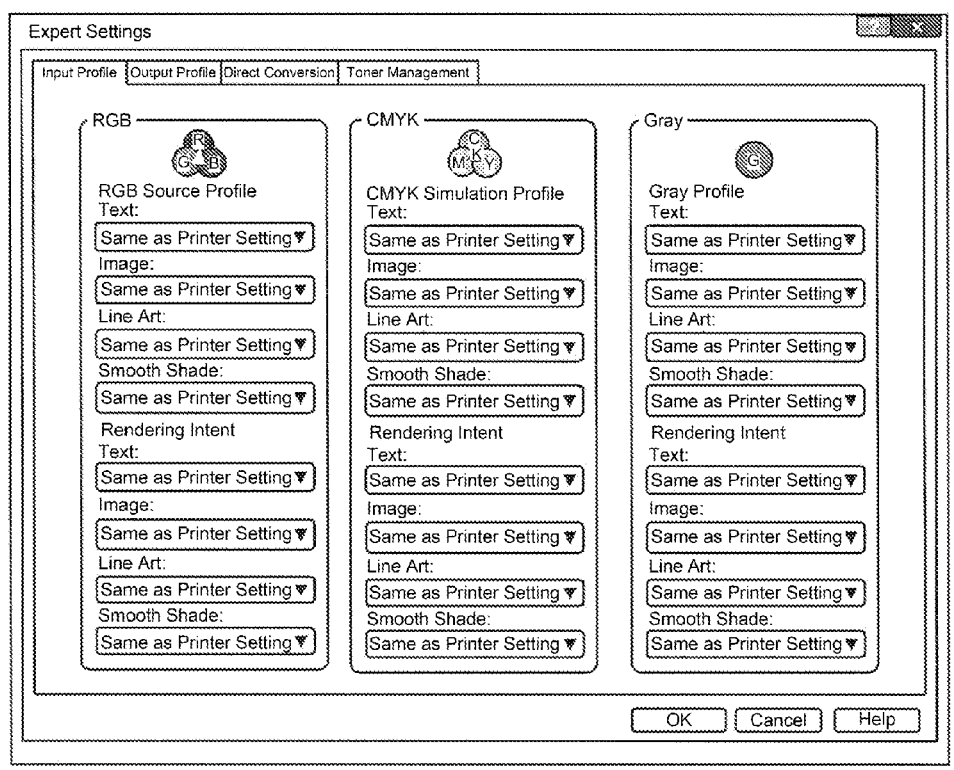
FIG. 17 is a diagram illustrating detail contents of the detail setting screen in the color setting relating to the printer driver as illustrated in FIG. 4.

After the basic setting screen is opened by the processing of opening the color basic setting screen (step S501), processing of opening a detail setting dialog by operating the operation unit (step S504) is performed in order to perform the profile setting for each object. When the detail setting screen is displayed as the detail setting dialog, processing of setting the color profile for each object on the detail setting screen (step S505) is performed. When desired color setting have been executed, processing of closing the color setting screen (step S503) is performed so as to finish the operation of the color printing setting. It should be noted that detail contents of the detail setting screen are illustrated in FIG. 17, which will be described later.

Figure 6:
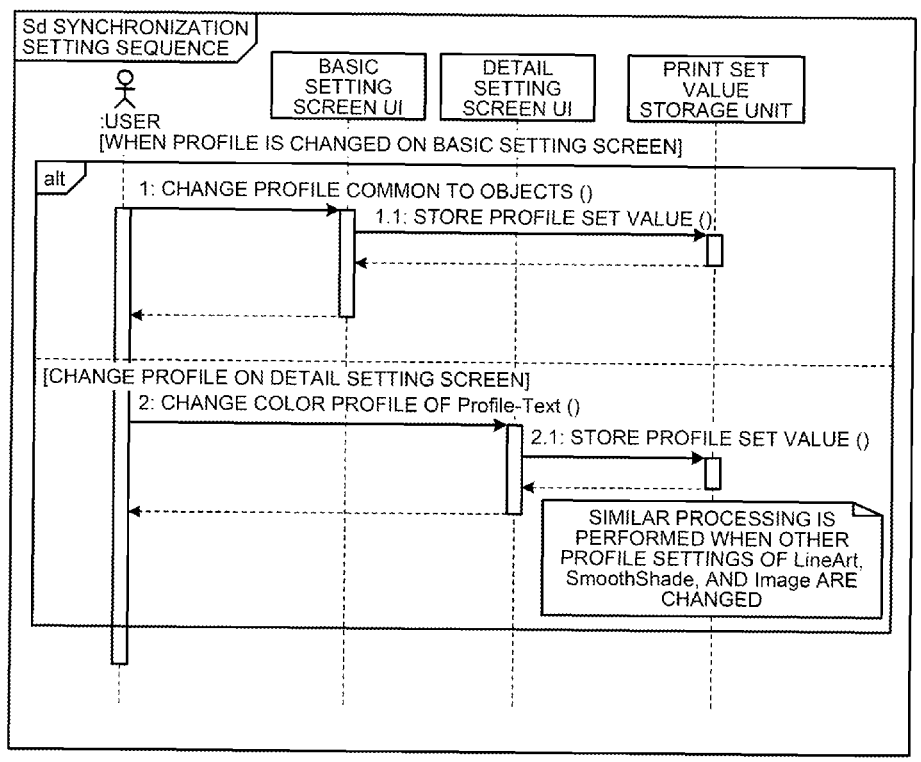
FIG. 6 is a sequence diagram illustrating an operation procedure of the color setting in the print setting relating to the printer driver as illustrated in FIG. 4.

FIG. 6 is a sequence diagram illustrating an operation procedure of the color setting in the print setting relating to the printer driver 300. With reference to FIG. 6, in the case where the profile is changed on the basic setting screen, when the user opens the color setting screen, for example, a basic setting screen UI on which setting of the color profile common to the objects is performed is displayed, so that the setting of the color profile can be performed on the basic setting screen UI in accordance with a processing flow. When the user wants to perform only the color basic setting, for example, the user performs the setting of the color profile common to the objects on the basic setting screen UI, so that the processing of changing the profile common to the objects is performed. A profile set value thereof is stored in the print set value storage unit 302, so that processing of storing the profile set value is performed. At the time of the setting of the color profile common to the objects, profile settings of the individual objects (Text, Image, Line Art, Smooth Shade) that can be set in detail are neglected. When the user wants to set the color profile for each object, the user selects Depend on Expert Setting in the color profile setting common to the objects. With this selection, the detail setting dialog is opened and a detail setting screen UI is displayed. For example, when setting of the color profile of Profile-Text is performed, processing of changing the color profile of Profile-Text is performed. A profile set value thereof is stored in the print set value storage unit 302, so that the processing of storing the profile set value is performed. Similar processing is performed when other profile settings of Line Art, Smooth Shade, and Image are changed. Finally, when desired color setting has been set, the color setting screen is closed to complete the color printing setting.

Figure 7:
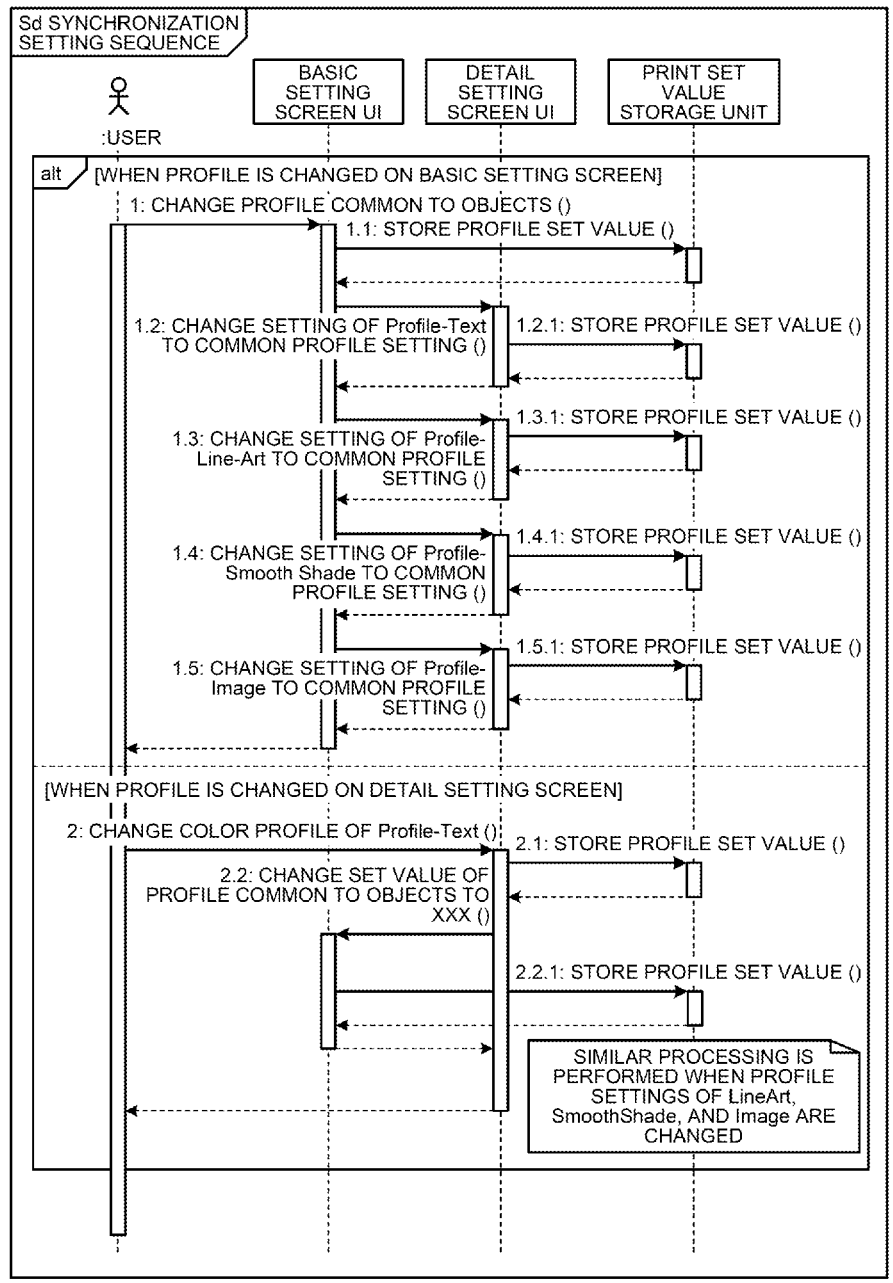
FIG. 7 is a sequence diagram illustrating an operation procedure of set value storage including set value synchronization processing at the time of setting changes on a basic setting screen and a detail setting screen in the color setting relating to the printer driver as illustrated in FIG. 4.

FIG. 7 is a sequence diagram illustrating an operation procedure of set value storage including set value synchronization processing at the time of setting changes on the basic setting screen and the detail setting screen in the color setting relating to the printer driver 300. With reference to FIG. 7, the procedure in the case where the profile is changed on the basic setting screen and the procedure in the case where the profile is changed on the detail setting screen are illustrated separately.

More specifically, it is indicated that in the case where the profile is changed on the basic setting screen, when the user changes the profile common to the objects on the basic setting screen UI, for example, the profile set value thereof is stored in the print set value storage unit 302 so that the profile settings of corresponding objects on the detail setting screen UI as well as the profile setting on the basic setting screen UI are adjusted to reflect this. It is also indicated that when setting of Profile-Text on the detail setting screen UI is changed to common profile setting, a profile set value thereof is stored in the print set value storage unit 302 so that the profile settings of corresponding objects on the detail setting screen UI as well as the profile setting on the basic setting screen UI are adjusted to reflect this. It is also indicated that when setting of Profile-Line Art on the detail setting screen UI is changed to the common profile setting, a profile set value thereof is stored in the print set value storage unit 302 so that the profile settings of corresponding objects on the detail setting screen UI as well as the profile setting on the basic setting screen UI are adjusted to reflect this. It is also indicated that when setting of Profile-Smooth Shade on the detail setting screen UI is changed to the common profile setting, a profile set value thereof is stored in the print set value storage unit 302 so that the profile settings of corresponding objects on the detail setting screen UI as well as the profile setting on the basic setting screen UI are adjusted to reflect this. It is also indicated that when setting of Profile-Image relating to the detail setting screen UI is changed to the common profile setting, a profile set value thereof is stored in the print set value storage unit 302 so that the profile settings of corresponding objects on the detail setting screen UI as well as the profile setting on the basic setting screen UI are adjusted to reflect this. It should be noted that, basically, the user can visually check the print set value and the print detail set value indicating contents of the changed profile setting on the basic setting screen UI and the detail setting screen UI.

In contrast, it is indicated that in the case where the profile is changed on the detail setting screen, when the user changes the color profile of Profile-Text on the detail setting screen UI, for example, a set value thereof is stored in the print set value storage unit 302 so that the profile settings of corresponding objects on the detail setting screen UI as well as the profile setting on the basic setting screen UI are adjusted to reflect this. In this case, the set value of the profile common to the objects on the basic setting screen UI is changed to XXX and the changed value is stored in the print set value storage unit 302, so that the detail setting screen UI and the basic setting screen UI are adjusted to reflect the set value XXX. Similar processing is performed when other profile settings of Line Art, Smooth Shade, and Image are changed. It should be noted that the user can also visually check the print set value and the print detail set value indicating contents of the changed profile setting on the basic setting screen UI and the detail setting screen UI.

FIG. 8 is a diagram illustrating set values (print set values) corresponding to color function setting items that are displayed on the basic setting screen in the order of identification number. With reference to FIG. 8, the setting item of identification number No. 1 is RGB Profile (common to objects) and the set values thereof are Path Through, Same As Printer Setting, color profile name, and Use expert settings. The setting item of identification number No. 2 is CMYK Profile (common to objects) and the set values thereof are Path Through, Same As Printer Setting, color profile name, and Use expert settings. The setting item of identification number No. 3 is Gray Profile (common to objects) and the set values thereof are Path Through, Same As Printer Setting, color profile name, and Use expert settings.

The setting item of identification number No. 4 is Reference Profile and the set values thereof are Path Through, Same As Printer Setting, and color profile name. The setting item of identification number No. 5 is Output Profile (common to objects) and the set values thereof are Path Through, Same As Printer Setting, color profile name, and Use expert settings. The setting item of identification number No. 6 is Spot Color Matching and the set values thereof are On and Off. The setting item of identification number No. 7 is Rendering Intent and the set values thereof are Perceptual, Saturation, Relative Colorimetric, Absolute Colorimetric, and Same As Printer Setting.

FIG. 9 is a diagram illustrating set values (print detail set values) corresponding to RGB profile-related setting items that are displayed on the detail setting screen in the order of identification number. With reference to FIG. 9, the setting item of identification number No. 1 is RGB Profile-Text and the set values thereof are Path Through, Same As Printer Setting, and color profile name. The setting item of identification number No. 2 is RGB Profile-Line Art and the set values thereof are Path Through, Same As Printer Setting, and color profile name. The setting item of identification number No. 3 is RGB Profile-Smooth Shade and the set values thereof are Path Through, Same As Printer Setting, and color profile name. The setting item of identification number No. 4 is RGB Profile-Image and the set values thereof are Path Through, Same As Printer Setting, and color profile name.

The setting item of identification number No. 5 is RGB Rendering Intent-Text and the set values thereof are Same As Printer Setting, Perceptual, Saturation, Relative Colorimetric, and Absolute Colorimetric. The setting item of identification number No. 6 is RGB Rendering Intent-Line Art and the set values thereof are Same As Printer Setting, Perceptual, Saturation, Relative Colorimetric, and Absolute Colorimetric. The setting item of identification number No. 7 is RGB Rendering Intent-Smooth Shade and the set values thereof are Same As Printer Setting, Perceptual, Saturation, Relative Colorimetric, and Absolute Colorimetric. The setting item of identification number No. 8 is RGB Rendering Intent-Image and the set values thereof are Same As Printer Setting, Perceptual, Saturation, Relative Colorimetric, and Absolute Colorimetric.

FIG. 10 is a diagram illustrating set values (print detail set values) corresponding to CMYK profile-related setting items that are displayed on the detail setting screen in the order of identification number. With reference to FIG. 10, the setting item of identification number No. 1 is CMYK Profile-Text and the set values thereof are Path Through, Same As Printer Setting, and color profile name. The setting item of identification number No. 2 is CMYK Profile-Line Art and the set values thereof are Path Through, Same As Printer Setting, and color profile name. The setting item of identification number No. 3 is CMYK Profile-Smooth Shade and the set values thereof are Path Through, Same As Printer Setting, and color profile name. The setting item of identification number No. 4 is CMYK Profile-Image and the set values thereof are Path Through, Same As Printer Setting, and color profile name.

The setting item of identification number No. 5 is CMYK Rendering Intent-Text and the set values thereof are Same As Printer Setting, Perceptual, Saturation, Relative Colorimetric, and Absolute Colorimetric. The setting item of identification number No. 6 is CMYK Rendering Intent-Line Art and the set values thereof are Same As Printer Setting, Perceptual, Saturation, Relative Colorimetric, and Absolute Colorimetric. The setting item of identification number No. 7 is CMYK Rendering Intent-Smooth Shade and the set values thereof are Same As Printer Setting, Perceptual, Saturation, Relative Colorimetric, and Absolute Colorimetric. The setting item of identification number No. 8 is CMYK Rendering Intent-Image and the set values thereof are Same As Printer Setting, Perceptual, Saturation, Relative Colorimetric, and Absolute Colorimetric.

FIG. 11 is a diagram illustrating set values (print detail set values) corresponding to Gray profile-related setting items that are displayed on the detail setting screen in the order of identification number. With reference to FIG. 11, the setting item of identification number No. 1 is Gray Profile-Text and the set values thereof are Path Through, Same As Printer Setting, and color profile name. The setting item of identification number No. 2 is Gray Profile-Line Art and the set values thereof are Path Through, Same As Printer Setting, and color profile name. The setting item of identification number No. 3 is Gray Profile-Smooth Shade and the set values thereof are Path Through, Same As Printer Setting, and color profile name. The setting item of identification number No. 4 is Gray Profile-Image and the set values thereof are Path Through, Same As Printer Setting, and color profile name.

The setting item of identification number No. 5 is Gray Rendering Intent-Text and the set values thereof are Same As Printer Setting, Perceptual, Saturation, Relative Colorimetric, and Absolute Colorimetric. The setting item of identification number No. 6 is Gray Rendering Intent-Line Art and the set values thereof are Same As Printer Setting, Perceptual, Saturation, Relative Colorimetric, and Absolute Colorimetric. The setting item of identification number No. 7 is Gray Rendering Intent-Smooth Shade and the set values thereof are Same As Printer Setting, Perceptual, Saturation, Relative Colorimetric, and Absolute Colorimetric. The setting item of identification number No. 8 is Gray Rendering Intent-Image and the set values thereof are Same As Printer Setting, Perceptual, Saturation, Relative Colorimetric, and Absolute Colorimetric.

FIG. 12 is a diagram illustrating set values (print detail set values) corresponding to Output profile-related setting items that are displayed on the detail setting screen in the order of identification number. With reference to FIG. 12, the setting item of identification number No. 1 is Output Profile-Text (Front) and the set values thereof are Path Through, Same As Printer Setting, and color profile name. The setting item of identification number No. 2 is Output Profile-Line Art (Front) and the set values thereof are Path Through, Same As Printer Setting, and color profile name. The setting item of identification number No. 3 is Output Profile-Smooth Shade (Front) and the set values thereof are Path Through, Same As Printer Setting, and color profile name. The setting item of identification number No. 4 is Output Profile-Image (Front) and the set values thereof are Path Through, Same As Printer Setting, and color profile name.

The setting item of identification number No. 5 is Output Profile-Text (Back) and the set values thereof are Path Through, Same As Printer Setting, and color profile name. The setting item of identification number No. 6 is Output Profile-Line Art (Back) and the set values thereof are Path Through, Same As Printer Setting, and color profile name. The setting item of identification number No. 7 is Output Profile-Smooth Shade (Back) and the set values thereof are Path Through, Same As Printer Setting, and color profile name. The setting item of identification number No. 8 is Output Profile-Image (Back) and the set values thereof are Path Through, Same As Printer Setting, and color profile name.

The setting item of identification number No. 9 is Output Rendering Intent-Text and the set values thereof are Same As Printer Setting, Perceptual, Saturation, Relative Colorimetric, and Absolute Colorimetric. The setting item of identification number No. 10 is Output Rendering Intent-Line Art and the set values thereof are Same As Printer Setting, Perceptual, Saturation, Relative Colorimetric, and Absolute Colorimetric. The setting item of identification number No. 11 is Output Rendering Intent-Smooth Shade and the set values thereof are Same As Printer Setting, Perceptual, Saturation, Relative Colorimetric, and Absolute Colorimetric. The setting item of identification number No. 12 is Output Rendering Intent-Image and the set values thereof are Same As Printer Setting, Perceptual, Saturation, Relative Colorimetric, and Absolute Colorimetric.

In summary, on the basic setting screen as illustrated in FIG. 8, the color profile setting common to the objects can be performed and the print detail set values on the detail setting screen are adjusted to reflect the print set values set on the basic setting screen. For example, in the case of the RGB Profile (common to objects) of the identification number No. 1 in FIG. 8, when the print set value is changed in the profile setting, the set values (print detail set values) of the RGB Profile-Text of the identification number No. 1, the RGB Profile-Line Art of the identification number No. 2, the RGB Profile-Smooth Shade of the identification number No. 3, and the RGB Profile-Image of the identification number No. 5 in the setting items on the detail setting screen in FIG. 9 are changed to the print set value set in FIG. 8. The same holds true for the CMYK Profile of the identification number No. 2, the Gray Profile of the identification number No. 3, and the Output Profile of the identification number No. 5 as other setting items common to the objects in FIG. 8. As will be described later, the Output Profile can be set individually on the front surface and the rear surface.

When the profile is set for each object in the detail setting as illustrated in FIG. 9 to FIG. 12, XXX is displayed in the setting items common to the objects on the basic setting screen as illustrated in FIG. 8 so as to display that the profile is not set commonly to the objects visually. The XXX display herein is an example and null characters and any other display patterns indicating that the profile is not set commonly to the objects visually clearly can be applied.

FIG. 13 is a diagram illustrating a correspondence table between items on the basic setting screen and items on the detail setting screen in the color setting relating to the printer driver 300 in the embodiment.

With reference to FIG. 13, Source Profile (CMYK) as the item (Basic Setting) on the basic setting screen corresponds to Text, Image, Line Art, and Smooth Shade of CMYK (cyan, magenta, yellow, black) in the corresponding settings of items on the detail setting screen. In the same manner, Source Profile (RGB) corresponds to Text, Image, Line Art, and Smooth Shade of RGB (red, green, blue) as the corresponding settings of items on the detail setting screen. Source Profile (Gray) corresponds to Text, Image, Line Art, and Smooth Shade of Gray as the corresponding settings of items on the detail setting screen. Source Profile (Output Profile) of the item (Basic Setting) on the basic setting screen can be separately set for the front surface and the rear surface in the corresponding settings of items on the detail setting screen and eight settings of Text Front, Image Front, Line Art Front, Smooth Shade Front, Text Back, Image Back, Line Art Back, and Smooth Shade Back correspond thereto. Information in the correspondence table corresponds to when the print set value storage unit 302 functions as the correspondence information storage unit that stores therein correspondence information in which the print set values on the basic setting screen and the print detail set values on the detail setting screen are associated with each other. The set value synchronization processing by the CPU (control unit) in the printer driver 300 is performed by adjusting the print detail set value on the detail setting screen to reflect the print set value on the basic setting screen in a synchronization manner based on the information in the correspondence table or alternatively adjusting the print set value on the basic setting screen to reflect the print detail set value on the detail setting screen in a synchronization manner based on the information in the correspondence table.

FIG. 14 is a diagram illustrating a linkage correspondence table at the time of setting of rendering intent in the color setting relating to the printer driver 300 in the embodiment.

With reference to FIG. 14, Rendering Intent is a function in which one setting is made for profiles of RGB, CMYK, Gray, and Output, so that linking settings for link to Rendering Intent (RGB) are Rendering Intent (CMYK), Rendering Intent (Gray), and Rendering Intent (Output). Regarding Rendering Intent, it is selectable whether it is set individually between or commonly to Text, Image, Line Art, and Smooth Shade. Rendering Intent Text (CMYK), Rendering Intent Text (Gray), and Rendering Intent Text (Output) are set so as to link to Rendering Intent Text (RGB); Rendering Intent Image (CMYK), Rendering Intent Image (Gray), and Rendering Intent Image (Output) are set so as to link to Rendering Intent Image (RGB); Rendering Intent Line Art (CMYK), Rendering Intent Line Art (Gray), and Rendering Intent Line Art (Output) are set so as to link to Rendering Intent Line Art (RGB); and Rendering Intent Smooth Shade (CMYK), Rendering Intent Smooth Shade (Gray), and Rendering Intent Smooth Shade (Output) are set so as to link to Rendering Intent Smooth Shade (RGB). When commonly set Rendering Intent is changed, commonly set Rendering Intent of each of other profiles is also changed in a linking manner. For example, when Rendering Intent common to the RGB profiles is changed, Rendering Intent common to the CMYK, Gray, and Output profiles is also changed. Similar processing is performed when setting of individual Rendering Intent is changed.

Figure 15:
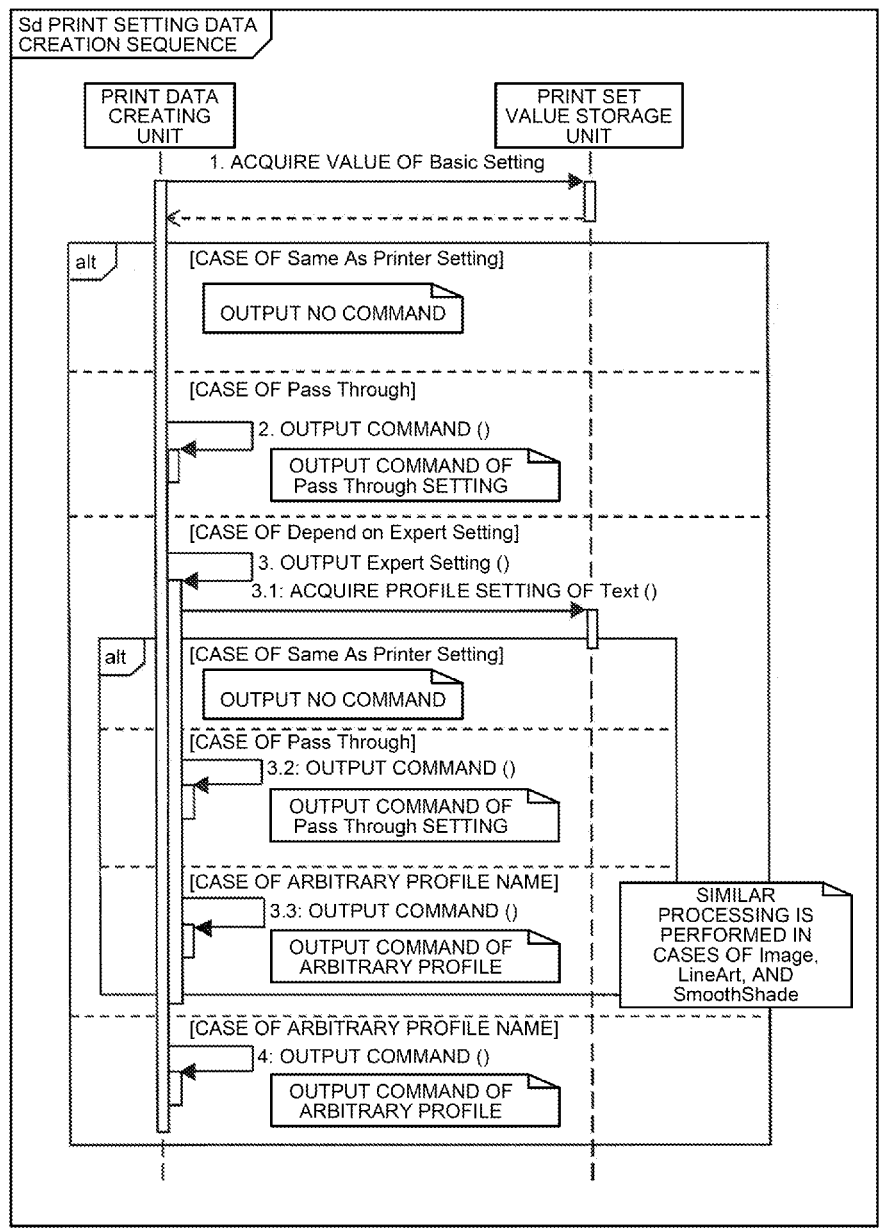
FIG. 15 is a sequence diagram illustrating an operation procedure of print setting data creation in the print setting relating to the printer driver as illustrated in FIG. 4.

FIG. 15 is a sequence diagram illustrating an operation procedure of print setting data creation in the print setting relating to the printer driver 300 in the embodiment.

With reference to FIG. 15, in the operation procedure of the print setting data creation, first, the print data creating unit 303 accesses the print set value storage unit 302 so as to acquire a value of Basic Setting. The print data creating unit 303 does not output a command when the value of Basic Setting is Same as printer setting but outputs a command of Pass through setting when the value of Basic Setting is Pass through and outputs a command of Expert setting when the value of Basic Setting is Depend on Expert setting. When the value of Basic Setting is Use expert settings in FIG. 8, for example, the print data creating unit 303 accesses the print set value storage unit 302 so as to acquire a set value of Expert setting and output a command for each object. It should be noted that the output command is described in a JDF job ticket and is transmitted to the printer.

For example, when the print data creating unit 303 acquires profile setting of text, it determines whether the value of the profile setting is Same as printer setting, Pass through, or an arbitrary profile name as a series of processing of alt after acquired. The print data creating unit 303 does not output a command when the value is Same as printer setting but outputs a command of Pass through setting when the value is Pass through and outputs a command of the arbitrary profile to a text object when the value is the arbitrary profile name corresponding to detail setting. Similar processing is performed for Image, Line art, and Smooth Shade. In this case, a JDF job ticket describing that a different profile is specified to each of them is generated. In addition, when an arbitrary profile name corresponding to the basic setting is set, the print data creating unit 303 outputs a command of the arbitrary profile in the same manner. In this case, a JDF job ticket not describing the profile for each of the items of Text, Image, Line art, and Smooth Shade but describing that one profile is specified is generated as the processing of all.

Thus, the print data creating unit 303 can specify a profile for each object and create print data when a print detail set value is stored in the print set value storage unit 302. On the other hand, the print data creating unit 303 can specify a profile common to the objects and create print data containing information indicating that the profile is common to the objects when the print detail set value is not stored in the print set value storage unit 302.

FIG. 16 is a diagram illustrating detail contents on the basic setting screen in the color setting relating to the printer driver 300 in the embodiment. FIG. 17 is a diagram illustrating detail contents on the detail setting screen in the color setting relating to the printer driver 300 in the embodiment.

The basic setting screen as illustrated in FIG. 16 indicates contents when profile setting common to the objects is performed at the basic setting level in the color printing setting. On the basic setting screen, in order to improve operability of the color profile, screen display on which the user can perform the profile setting in a flowchart format while checking the processing flow is made.

The detail setting screen as illustrated in FIG. 17 indicates contents when profile setting for each object is performed at the specific setting level as another dialog in the color printing setting. On the detail setting screen, the profile setting for each object can be performed on another dialog for detail setting, so that a troublesome task of opening another dialog in order to perform only the basic color setting can be omitted unlike the conventional case.

The printer driver 300 according to the embodiment as described above enables setting on the display screen of the display unit (LCD) relating to the color printing through the user interface by operation control of the CPU as the control unit to be performed such that the print set value and the print detail set value are set on two stages of the basic setting screen at the basic setting level and the detail setting screen at the detail setting level separately by operating the operation unit. The detail setting screen at the detail setting level is displayed as another dialog and omitted from the basic setting screen, and the basic setting at the first stage is arranged on the basic setting screen. With this, detail setting can be performed separately. This eliminates the troublesome task of opening another dialog for setting when the color profile common to the objects is set unlike the conventional case, and the complication of print setting can be eliminated.

The basic function of the printer driver 300 in the embodiment can be considered as a printing control method for a printer driver provided in the client terminal connected, through the network, to the DFE controller for performing high-speed image processing that is externally attached to the printer 100 capable of performing color printing, and performing setting of the color printing through the user interface connected to the display unit (LCD) and the operation unit. The printing control method for the printer driver in this case includes a control step of controlling operation processing of individual units through the user interface by the control unit (CPU), a print set value storage step of storing, by the print set value storage unit 302, the print set value that is set by operation of the operation unit on the basic setting screen displayed on the display unit on which setting relating to color printing is performed at the basic level and the print detail set value that is set by operation of the operation unit on the detail setting screen as another dialog on which the setting relating to color printing is performed at the detail level under operation control at the control step, a print data creating step of creating, by the print data creating unit 303, print data of the color printing based on the print set value and the print detail set value under the operation control at the control step, a data transmitting step of transmitting, by the data transmission unit 305, the print data to the printer 100 via the DFE controller through the network under the operation control at the control step, and a data receiving step of receiving, by the data receiving unit 304, information from the printer 100 via the DFE controller through the network under the operation control at the control step.

At the control step, the set value synchronization processing of adjusting the print detail set value on the detail setting screen to reflect change of the print set value in a synchronized manner when the print set value is changed on the basic setting screen and adjusting the print set value on the basic setting screen to reflect change of the print detail set value in a synchronized manner when the print detail set value is changed on the detail setting screen is performed on the print set value set on the basic setting screen and the print detail set value set on the detail setting screen that are stored in the print setting storage step. In conjunction with this, when the method includes a correspondence information storage step of storing correspondence information in which the print set value and the print detail set value are associated with each other, set value synchronization processing of adjusting the print detail set value on the detail setting screen to reflect change of the print set value based on the correspondence information provided at the correspondence information storage step in a synchronized manner when the print set value is changed on the basic setting screen and adjusting the print set value on the basic setting screen to reflect change of the print detail set value based on the correspondence information provided at the correspondence information storage step in a synchronized manner when the print detail set value is changed on the detail setting screen is performed at the control step. Furthermore, at the control step, setting of the print set value is changed on the basic setting screen is displayed when the print set value on the basic setting screen is changed in a synchronized manner at the change of the print detail set value on the detail setting screen. The basic setting screen at the print set value storage step is set to the setting screen on which profile setting common to the objects is performed and the detail setting screen is set to the setting screen on which profile setting for each object is performed. With this, at the above-mentioned control step, when the profile setting common to the objects is changed on the basic setting screen, the print detail set value according to the profile setting for each object on the detail setting screen is adjusted to reflect the print set value according to the profile setting common to the objects. Furthermore, when the profile setting for each object is changed on the detail setting screen, the print set value by the profile setting common to the objects on the basic setting screen is adjusted to reflect a value indicating that the print detail set value by the profile setting for each object is set individually. In conjunction with this, at the print data creating step, a profile is specified for each object and print data is created when the print detail set value is stored at the print set value storage step and a profile common to the objects is specified and print data containing information indicating that the profile is common to the objects is created when the print detail set value is not stored at the print set value storage step. In addition, at the control step, when the profile setting common to the objects on the basic setting screen is changed at the time of the change of the profile setting for each object on the detail setting screen, the profile setting is changed on the basic setting screen is displayed as XXX.

The control step, the print set value storage step, the print data creating step, the data transmitting step, and the data receiving step in the above-mentioned printing control method for the printer driver may be a printing control program for the printer driver that are executed by a computer. The printing control program for the printer driver can be recorded in a recording medium that is readable by the computer.

Although the printer driver 300 according the embodiment as described above is applied to the three client terminals (clients PC 1 to 3) in the printing system as illustrated in FIG. 1, the number of client terminals may not be three, so that the printer driver 300 in the invention is not limited to the mode as disclosed in the embodiment.

According to an embodiment, setting on the display screen of the display unit relating to the color printing through the user interface by the operation control of the control unit can be performed such that the print set value and the print detail set value are set on two stages of the basic setting screen at the basic setting level and the detail setting screen at the detail setting level separately by operating the operation unit. The detail setting screen at the detail setting level is displayed as another dialog and omitted from the basic setting screen, and the basic setting at the first stage is arranged on the basic setting screen. With this, detail setting can be performed separately. This eliminates the troublesome task of opening another dialog for setting when the color profile common to the objects is set unlike the conventional case, and the complication of print setting can be eliminated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing unit provided in a client terminal connected, through a network, to a controller that is externally attached to a printer capable of performing color printing to generate printed matter and is configured to perform high-speed image processing, the information processing unit performing setting of the color printing using a user interface connected to a display unit and an operation unit, the information processing unit comprising:
    a control unit configured to control operation processing of individual units through the user interface;
    a print set value storage unit configured to store a print set value that is set by operation of the operation unit on a basic setting screen displayed on the display unit on which setting relating to the color printing is performed at a basic level and one or more print detail set values that are set by operation of the operation unit on a detail setting screen as another dialog on which the setting is performed at a detail level under operation control of the control unit;
    a print data creating unit configured to create print data of the color printing based on the print set value and the print detail set value under operation control of the control unit;
    a data transmission unit configured to transmit the print data to the printer via the controller through the network under operation control of the control unit; and
    a data receiving unit configured to receive information from the printer via the controller through the network under operation control of the control unit,
    wherein the basic setting screen is a setting screen on which profile setting common to a plurality of object types is performed,
    the detail setting screen being a screen for performing, for each individual object type among the plurality of object types, profile settings for the object type,
    the plurality of objects types being types of objects the printer is capable of printing on the printed matter, and
    wherein the print data creating unit is configured to,
        specify a profile for each object type among the plurality of object types and create print data, when the one or more print detail set values stored in the print set value storage unit includes a print detail set value for each of the plurality of object types, respectively, and
        specify a profile common to the plurality of object types and create print data containing information indicating that the profile is common to the plurality of object types, when print set value storage unit does not include a print detail set value for each of the plurality of object types, respectively.

2. The information processing unit according to claim 1, wherein the control unit performs, on the print set value set on the basic setting screen and the one or more print detail set values set on the detail setting screen that are stored in the print setting storage unit, set value synchronization processing of adjusting the one or more print detail set values on the detail setting screen to reflect change of the print set value in a synchronized manner when the print set value is changed on the basic setting screen and adjusting the print set value on the basic setting screen to reflect change of the one or more print detail set values in a synchronized manner when at least one of the one or more print detail set values is changed on the detail setting screen.

3. The information processing unit according to claim 2, wherein the control unit displays that the print set value on the basic setting screen is changed when the print set value on the basic setting screen is changed in a synchronized manner at the time of change of at least one of the one or more print detail set values on the detail setting screen.

4. The information processing unit according to claim 1, wherein the control unit adjusts the one or more print detail set values according to the profile setting for each object on the detail setting screen to reflect the print set value according to the profile setting common to the objects when the profile setting common to the objects is changed on the basic setting screen and adjusts the print set value according to the profile setting common to the objects on the basic setting screen to reflect a value indicating that the one or more print detail set values according to the profile setting for each object are set individually when the profile setting for each object is changed on the detail setting screen.

5. The information processing unit according to claim 4, wherein the control unit displays that the profile setting is changed on the basic setting screen as XXX when the profile setting common to the objects on the basic setting screen is changed at the time of change of the profile setting for each object on the detail setting screen.

6. The information processing unit according to claim 2, further comprising a correspondence information storage unit configured to store correspondence information in which the print set value and the one or more print detail set values are associated with each other, wherein
the control unit performs set value synchronization processing of adjusting the one or more print detail set values on the detail setting screen to reflect change of the print set value in a synchronized manner based on the correspondence information when the print set value is changed on the basic setting screen and adjusting the print set value on the basic setting screen to reflect change of the one or more print detail set values in a synchronized manner based on the correspondence information when at least one of the one or more print detail set values is changed on the detail setting screen.

7. The information processing unit according to claim 1, wherein the plurality of object types include a test type, an image type, a line art type, and smooth shade type.

8. A printing control method for a printer driver provided in a client terminal connected, through a network, to a controller that is externally attached to a printer capable of performing color printing to generate printed matter and is configured to perform high-speed image processing, the printer driver performing setting of the color printing using a user interface connected to a display unit and an operation unit, the printing control method comprising:

controlling, by a control unit, operation processing of individual units through the user interface;
storing, by a print set value storage unit, a print set value that is set by operation of the operation unit on a basic setting screen displayed on the display unit on which setting relating to the color printing is performed at a basic level and one or more print detail set values that are set by operation of the operation unit on a detail setting screen as another dialog on which the setting relating to the color printing is performed at a detail level under operation control at the controlling;
creating, by a print data creating unit, print data of the color printing based on the print set value and the print detail set value under operation control at the controlling;
transmitting, by a data transmitting unit, the print data to the printer via the controller through the network under operation control at the controlling; and
receiving, by a data receiving unit, information from the printer via the controller through the network under operation control at the controlling,
wherein the basic setting screen is a setting screen on which profile setting common to a plurality of object types is performed,
the detail setting screen being a screen for performing, for each individual object type among the plurality of object types, profile settings for the object type,
the plurality of objects types being types of objects the printer is capable of printing on the printed matter, and
wherein the creating includes,
specifying a profile for each object type among the plurality of object types and create print data, when the one or more print detail set values stored in the print set value storage unit includes a print detail set value for each of the plurality of object types, respectively, and
specifying a profile common to the plurality of object types and create print data containing information indicating that the profile is common to the plurality of object types, when print set value storage unit does not include a print detail set value for each of the plurality of object types, respectively.

9. The printing control method for the printer driver according to claim 8, wherein at the controlling, set value synchronization processing of adjusting the one or more print detail set values on the detail setting screen to reflect change of the print set value in a synchronized manner when the print set value is changed on the basic setting screen and adjusting the print set value on the basic setting screen to reflect change of the one or more print detail set values in a synchronized manner when at least one of the one or more print detail set values is changed on the detail setting screen is performed on the print set value set on the basic setting screen and the one or more print detail set values set on the detail setting screen that are stored at the storing.

10. The printing control method for the printer driver according to claim 9, wherein at the controlling, the print set value is changed on the basic setting screen is displayed when the print set value on the basic setting screen is changed in a synchronized manner at the time of change of at least one of the one or more print detail set values on the detail setting screen.

11. The printing control method for the printer driver according to claim 8, wherein at the controlling, the one or more print detail set values according to the profile setting for each object on the detail setting screen are adjusted to reflect the print set value according to the profile setting common to the objects when the profile setting common to the objects is changed on the basic setting screen and the print set value according to the profile setting common to the objects on the basic setting screen is adjusted to reflect a value indicating that the one or more print detail set values according to the profile setting for each object are set individually when the profile setting for each object is changed on the detail setting screen.

12. The printing control method for the printer driver according to claim 11, wherein at the controlling, the profile setting is changed on the basic setting screen is displayed as XXX when the profile setting common to the objects on the basic setting screen is changed at the time of change of the profile setting for each object on the detail setting screen.

13. The printing control method for the printer driver according to claim 9, wherein the storing comprises storing, by a correspondence information storage unit, correspondence information in which the print set value and the one or more print detail set values are associated with each other, wherein at the controlling, set value synchronization processing is performed, the set value synchronization processing adjusting the one or more print detail set values on the detail setting screen to reflect change of the print set value in a synchronized manner based on the correspondence information provided at the storing of the correspondence information when the print set value is changed on the basic setting screen and adjusting the print set value to reflect change of the one or more print detail set values on the basic setting screen based on the correspondence information provided at the storing of the correspondence information when at least one of the one or more print detail set values is changed on the detail setting screen.

14. A computer program product comprising a non-transitory computer-readable medium containing an information processing program, the program causing a computer to perform the storing, the creating, the transmitting, the receiving, and the controlling in the printing control method for the printer driver according to claim 8.

15. The printing control method for the printer driver according to claim 8, wherein the plurality of object types include a test type, an image type, a line art type, and smooth shade type.

* * * * *